United States Patent [19]
Sumoto et al.

[11] 3,957,905
[45] May 18, 1976

[54] FIRE RETARDANT THERMOPLASTIC POLYESTER TYPE BLOCK COPOLYMER COMPOSITION

[75] Inventors: Misao Sumoto; Hiroshi Imanaka; Masaharu Shirai, all of Otsu, Japan

[73] Assignee: Toyo Boseki Kabushiki Kaisha, Osaka, Japan

[22] Filed: Jan. 17, 1974

[21] Appl. No.: 434,144

[30] Foreign Application Priority Data
Jan. 18, 1973 Japan.................................. 48-8304

[52] U.S. Cl. ............................ 260/860; 260/18 PF; 260/45.7 R; 260/45.75 R; 260/45.8 A; 260/45.85 H; 260/835; 260/DIG. 24
[51] Int. Cl.² ................... C08G 51/58; C08G 39/10
[58] Field of Search ................. 260/860, 835, 45.7, 260/45.75, 45.95, 45.8 A, DIG. 24, 75 H

[56] References Cited
UNITED STATES PATENTS

| | | | |
|---|---|---|---|
| 3,320,210 | 5/1967 | Caldwell et al. | 260/45.8 X |
| 3,652,713 | 3/1972 | Okazaki et al. | 260/860 |
| 3,833,685 | 9/1974 | Wambach | 260/860 |

*Primary Examiner*—Murray Tillman
*Assistant Examiner*—T. Pertilla
*Attorney, Agent, or Firm*—Kaufman & Kramer

[57] ABSTRACT

A fire retardant thermoplastic polyester type block copolymer composition, which comprises (a) a thermoplastic polyester type block copolymer comprising a hard polyester segment having a high melting point and a soft polymer segment having a low melting point and a molecular weight of 400 to 6,000 and (b) a mixture of one or more kinds of halogenated bisphenyl compounds and an organic or inorganic antimony compound in a ratio of 1:0 to 1:3 by weight, and optionally one or more kinds of alkylphenol derivatives and/or an epoxy compound having 1 to 20 % by weight of oxirane oxygen.

18 Claims, No Drawings

FIRE RETARDANT THERMOPLASTIC POLYESTER TYPE BLOCK COPOLYMER COMPOSITION

The present invention relates to a fire retardant polyester type block copolymer composition, i.e. a polyester type block copolymer composition having low flammability characteristics.

Thermoplastic polyether type block copolymers are interesting resins as a thermoplastic elastomer and demands therefor have recently risen, because various kinds of the resin such as from soft elastomer to semi-rigid plastic can be produced; the resin has excellent properties, such as heat resistance, cold-proofing, toughness, chemical proofing, water proofing and oil resistance; the resin can be molded into variously shaped products by coventional plastic molding methods, such as injection molding, extrusion molding, blow molding and rotomolding, and therefore the resin has been widely used in various utilities, such as hosepipe, tube, various industrial parts, various electrical parts, wire coating material, building component and film. However, the resin is easily flamed and thereby the utilities thereof are restricted, especially when it is used for electrical parts, wire coating material or building component.

The thermoplastic polyester type block copolymer includes oxygen moieties in the molecular chain and therefore it is more easily flamed in comparison with the conventional thermoplastic resin. This fact can be made clear by its limiting oxygen index (it is measured by the provision of ASTM D-2863). For instance, the limiting oxygen index of an aromatic polyester; polybutylene terephthalate is 20.5, and on the other hand, a polyester type block copolymer, e.g. a block polymer produced from polybutylene terephthalate as the hard polyester segment having high melting point and polytetramethylene oxide glycol as the soft polymer segment having low melting point has limiting oxygen index of 18 to 19. The oxygen content in air is about 21 % and therefore it is clear that the polyester type block copolymer has large flammability in air.

The present inventors have studied to find a method for lowering the flammability of the thermoplastic polyester type block copolymer.

For lowering the flammability of plastics there have, hitherto, been used halogenated compounds, organic phosphorus compounds, halogen-containing organic phosphorus compounds and the like, and thereby the object has been fairly achieved, but on the other hand, some properties of the resins are simultaneously deteriorated. For instance, most organic phosphorus compounds are liquid, and then when the compounds are added to the resin, the flammability of the resin is lowered but on the other hand, the resin is plasticated at room temperature. Further, when a fire retardant additive having far higher melting point than that of the resin is added, the elasticity modulus of the resin increases and the resin becomes rigid.

Thermoplastic polyester type block copolymers have different problems to those of the conventional plastics. For instance, when to a thermoplastic polyester type block copolymer having soft elasticity is added to fire retardant additive having low melting point, the copolymer is extremely plasticated and thereby the molding property thereof is lowered and occasionally it can not be molded. On the other hand, when to a semi-rigid thermoplastic polyester type block copolymer is added a fire retardant additive having high melting point and being hardly compatible with the resin, it results in lowering of the flexibility which is one of the most important characteristics of the resin, and further the degree of elongation is also lowered. Moreover, when the thermoplastic polyester type block copolymer includes segment comprising polyalkylene oxide glycol, it is particularly unstable to heat, and therefore, the decomposition of the fire retardant additive induces the deterioration of the copolymer, which has been observed, for instance, in case of using thereof at high temperature. This is the most important problem in the field.

It has been known that a dehydrohalogenation reaction occurs in some compounds of the haloganated fire retardant additives even at lower temperature than the decomposition temperature thereof. This causes the deterioration of the resin, when the fire retardant additive is kneaded together with the resin, or when the resin including the fire retardant additive is molded or the product is used at a high temperature. The degree of the deterioration is largely different by the kinds of the fire retardant additives to be added. For instance, the thermoplastic polyester type block copolymer blended with 25 % by weight of tetrabromobisphenol A is deteriorated in case of treatment of 120°C for 24 hours. Furthermore, some of halogenated fire retardant additives sublimate, and therefore, when the resin blended with such fire retardant additive is allowed to stand at a high temperature, the fire retardant additive is gradually sublimated and thereby the concentration of the additive in the resin is reduced, which causes the lowering of the fire retardant properties. For instance, when the polyester type block copolymer blended with tetrabromophthalic anhydride is heated at 120°C for 24 hours, about 60 % by weight of the tetrabromophthalic anhydride sublimates and then the product can not be used practically.

Thus, these fire retardant additives are not fit for the thermoplastic polyester type block copolymer which is often used at a high temperature.

Under the circumstances, it has been studied to find out a fire retardant and heat resistant thermoplastic polyester type block copolymer composition without loosing the peculiar physical properties of the resin, and then it has now been found that the desired composition can be obtained by blending it with a specific fire retardant.

An object of the present invention is to provide a fire retardant thermoplastic polyester type block copolymer composition which is not deteriorated even if it is used at a high temperature. Generally, a fire retardant composition is required to have fire retardant properties and also heat resistance, but the fire retardant thermoplastic polyester type block copolymer tends to reduce the heat resistance and heat aging properties which become lower than those of the polyester type block copolymer per se, which restricts the utility of the composition.

Then, another object of the invention is to provide a fire retardant thermoplastic polyester type block copolymer composition having improved heat resistance and heat aging properties.

These and other objects will be apparent from the description hereinafter.

According to the present invention, the desired fire retardant thermoplastic polyester type block copolymer composition can be obtained by adding one or more kinds of halogenated bisphenyl compounds selected from the group consisting of a compound of the formula (I), a compound of the formula (II) and a low molecular weight polymer having 2 to 11 repeating units of the formula (III) of a mixture of the halogenated bisphenyl compound and an organic or inorganic antimony compound to a polyester type block copolymer comprising a hard polyester segment having a high melting point and about 1 to 85 % by weight, preferably 5 to 80 % by weight (on the basis of the weight of the copolymer) of a soft polymer segment having an average molecular weight of 400 to 6,000 and having a low melting point.

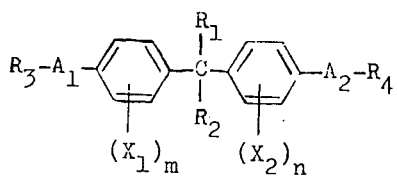

(I)

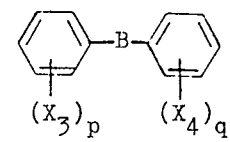

(II)

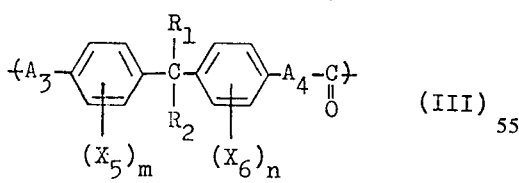

(III)

wherein $R_1$ and $R_2$ are each hydrogen or an alkyl having 1 to 4 carbon atoms; $R_3$ and $R_4$ are each an alkyl having 1 to 18 carbon atoms, an acyl or glycidyl wherein the hydrogen combined with carbon atom may be substituted by bromine or chlorine; $A_1$, $A_2$, $A_3$ and $A_4$ are each oxygen or sulfur; B is oxygen, sulfur or sulfoxide; $X_1$, $X_2$, $X_3$, $X_4$, $X_5$ and $X_6$ are each bromine or chlorine; $m$ and $n$ are an integer of 1 to 4 and $m+n$ is 4 to 8; and $p$ and $q$ are an integer of 1 to 5 and $p+q$ is 4 to 10.

In the above composition, the halogenated bisphenyl compound may be added alone or in a mixture with the organic or inorganic antimony compound. The ratio of the halogenated bisphenyl compound and the antimony compound may be preferably in a range of 1:0.001 to 1:3, more preferably 1:0.01 to 1:3 by weight. That is, in the present invention, there may be used a mixture of the halogenated bisphenyl compound and the antimony compound in a resin of 1:0 to 1:3 by weight.

According to the present invention, the desired fire retardant thermoplastic polyester type block copolymer composition having improved heat resistance and heat aging properties can be produced by aging further an alkylphenol derivative of the formula (IV) or (V) and/or an epoxy compound having 1 to 20 % by weight of oxirane oxygen to the fire retardant thermoplastic polyester type block copolymer composition comprising a thermoplastic polyester type block copolymer and one or more kinds of the above-mentioned halogenated bisphenyl compounds or a mixture of the halogenated bisphenyl compound and an antimony compound.

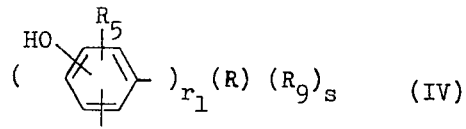

(IV)

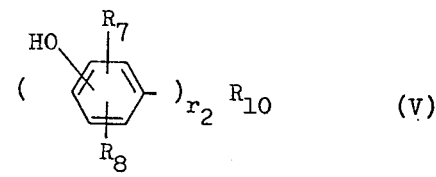

(V)

wherein $R_5$, $R_6$, $R_7$ and $R_8$ are each an alkyl having 1 to 18 carbon atoms, $R_9$ and $R_{10}$ are each a hydrocarbon group having 1 to 18 carbon atoms, R is a hydrocarbon group having one or more groups selected from —COO—, —NHCO— and

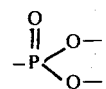

in the molecular chain or on the terminal of the molecule, —S—, —NHCO— or

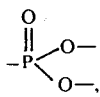

$r_1$ and $r_2$ are each integer of 1 to 4, and $s$ is a numeral such that $(r_1 + 5)$ is equal to the numeral of the total bonding valent of R.

The thermoplastic polyester type block copolymer comprises a hard polyester segment having a high melting point and a soft polymer segment having a low melting point and a molecular weight of 400 to 6,000, wherein the hard polyester segment has a melting point of 150°C or more when a high molecular weight polymer is produced from the compound thereof alone, and the soft polymer segment has melting or softening point of 80°C or less.

The examples of the polyester which constitutes the hard polyester segment having a high melting point may be a homopolyester produced from an aromatic dicarboxylic acid (e.g. terephthalic acid, isophthalic acid, 1,5-naphthalenedicaboxylic acid, 2,6-naphthalenedicarboxylic acid, or bisphenyl-4,4'-dicarboxylic acid) and an aliphatic, aromatic or alicyclic diol having 2 to 10 carbon atoms (e.g. ethylene glycol, 1,2-propanediol, 1,3-propanediol, 1,4-butanediol, 1,5-pentanediol, 1,6-hexanediol, 1,10-decanediol, p-xylylene glycol, or 1,4-cyclohexanedimethanol); a copolyester produced by copolymerizing further one or more kinds of the dicarboxylic acid as mentioned above and/or one or more kinds of the diol as mentioned above; a homopolyester or copolyester produced from a hydroxy acid (e.g. p-(β-hydroxyethoxy)benzoic acid, or p-hydroxybenzoic acid); polypivalolactone; and a polyether ester produced from an aromatic ether dicarboxylic acid (e.g. 1,2-bis(4,4'-dicarboxyphenoxy)ethane) and a diol as mentioned above.

The preferred example of the polyester is the one produced from a dicarboxylic acid containing 70 or more % by mol of terephthalic acid or its ester-forming derivative and an aliphatic, aromatic or alicyclic diol, preferably an aliphatic diol. Particularly, the polyester may be preferably produced from a dicarboxylic acid containing 70 or more % by mol of terephthalic acid or its ester-forming derivative and a diol containing 70 or more % by mol of 1,4-butanediol. The most practically useful polyester is the one produced from terephthalic acid and 1,4-butanediol.

The polymer which constitutes the soft polymer segment having a low melting point may be substantially amorphous in the thermoplastic polyester type block copolymer and has an average molecular weight of 400 to 6,000. The examples of the polymer may be a polyalkylene oxide glycol (e.g. poly(ethylene oxide) glycol, poly(tetramethylene oxide) glycol, glycol copolymer of ethylene oxide and tetrahydrofuran, or glycol copolymer of ethylene oxide and propylene oxide); and an aliphatic polyester, such as a polyester produced from an aliphatic dicarboxylic acid having 2 to 12 carbon atoms and an aliphatic glycol having 2 to 10 carbon atoms, such as a condensation aliphatic polyester (e.g. polyethylene adipate, polytetramethylene adipate, polytetramethylene dodecanoate, polyneopentyl azelate, polyneopentyl adipate, or polyneopentyl sebacate); and a polylactone (e.g. poly-ϵ-caprolactone, or polyvalerolactone). The preferred soft polymer segment having a low melting point is the one produced from polyalkylene oxide glycol, more preferably polytetramethylene oxide glycol. The soft polymer segment is preferably included in a ratio of 1 to 85 % by weight, more preferably 5 to 80 % by weight in the thermoplastic polyester type block copolymer.

The suitable examples of the thermoplastic polyester type block copolymer comprising a hard polyester segment having a high melting point and a soft polymer segment having a low melting point may be polyethylene terephthalate/polyethylene oxide block copolymer, polyethylene terephthalate/polytetramethylene oxide block copolymer, polytetramethylene terephthalate/polyethylene oxide block copolymer, polytetramethylene terephthalate/polytetramethylene oxide block copolymer, polytetramethylene terephthalate. isophthalate/polytetramethylene oxide block copolymer, polyethylene terephthalate/poly-ϵ-caprolactone block copolymer, polytetramethylene terephthalate/poly-ϵ-caprolactone block copolymer, polypivalolactone/poly-ϵ-caprolactone block copolymer, polyethylene terephthalate/polyethylene adipate block copolymer, polyethylene terephthalate/polyneopentyl sebacate block copolymer, polytetramethylene terephthalate/polyneopentyl dodecanoate block copolymer or the like. Among them, polytetramethylene terephthalate/polytetramethylene oxide block copolymer, polytetramethylene terephthalate. isophthalate/polytetramethylene oxide block copolymer and polytetramethylene terephthalate/poly-ϵ-caprolactone block copolymer are preferable one.

The preferred block copolymer useful for the present invention may be the one comprising a polyester produced from a dicarboxylic acid containing 70 or more % by mol of terephthalic acid or its ester-forming derivative and an aliphatic, aromatic or alicyclic diol (as the hard polyester segment) and a polyalkylene oxide glycol or an aliphatic polyester (as the soft polymer segment). Particularly, the thermoplastic polyester type block copolymer may preferably comprise a dicarboxylic acid containing 70 or more % by mol of terephthalic acid or its ester-forming derivative (as the hard polyester segment) and a polyalkylene oxide glycol (as the soft polymer segment). The most preferable one is polytetramethylene terephthalate/polytetramethylene oxide block copolymer.

These thermoplastic polyester type block copolymers may be produced by conventional methods. For instance, the copolymer may be produced by subjecting dimethyl ester of an aromatic dicarboxylic acid, a diol and a polymer for producing the soft polymer segment to ester exchange reaction at about 150° to 240°C in the presence of polycondensation catalyst, removing the by-produced methanol, and then heating the prepolymer thus produced at 230° to 260°C in high vacuum.

Alternatively, the thermoplastic polyester type block copolymers may be produced by mixing and reacting a hard polyester segment-forming prepolymer and a soft polymer segment-forming prepolymer, which are previously produced, with a difunctional compound which is reactive with the terminal functional group of the prepolymers, and if necessary, removing the volatile materials at high vacuum.

Further alternatively, the block copolymer may be produced by heating a hard polyester having a high melting point and high degree of polymerization together with a lactone monomer to subject them to ester exchange reaction whereby the lactone is ring-opened and polymerized.

The halogenated bisphenyl compound used in the present composition functions as a fire retardant additive and is selected from a compound of the formula (I), a compound of the formula (II) and a low molecular weight polymer comprising repeated units of the formula (III). The halogenated bisphenyl compound has two halogen-substituted phenyl rings in the molecule but the phenyl rings are not necessarily the same.

The suitable examples of the compound (I) may be 2,2-bis-[4-(2,3-dibromopropoxy)-3,5-dibromophenyl]propane, 2,2-bis(4-acetoxy-3,5-dibromophenyl)propane, 2,2-bis(4-ethoxy-3,5-dibromophenyl)propane, 2,2-bis(3,5-dibromo-4-hydroxyphenyl)propane diglycidyl ether. bis[4-(2,3-dibromoporpoxy)-3,5-dichlorophenyl]methane, or the like.

The suitable examples of the compound (II) may be bis(2,4-dichlorophenyl)sulfide, bis(2,4-dibromophenyl) ether, bis(2,4-trichlorophenyl)ether, bis(2,4,6-tribromophenyl) ether, 2,4-dichloro-2',4'-dibromobiphenyl sulfoxide, decabromobiphenyl ether, or the like. Among them, the preferred one is the compound having the formula (II) wherein A is oxygen and $p + s$ is 6 to 10, for instance, bis(2,4,6-tribromophenyl)ether and decabromobiphenyl ether.

The low molecular weight polymer comprising repeating units of the formula (III) is a halogenated polycarbonate having a low molecular weight and may be produced by reacting a divalent halogenated phenol with carbonyl bromide or carbonyl chloride in the presence of a monofunctional chain terminator. The suitable examples of the divalent phenol may be 2,2-bis(3,5-dibromo-4-hydroxyphenyl)propane, 2,2-bis(3,5-dichloro-4-hydroxyphenyl)propane, bis(3,5-dibromo-4-hydroxyphenyl)methane, bis(3,5-dichloro-4-hydroxyphenyl)methane, 2,2-bis(4-hydroxy-2,3,5,6-tetrabromophenyl)propane, 2,2-bis(4-hydroxy-2,3,5,6-tetrachlorophenyl)propane, or the like. The most preferred one is 2,2-bis(3,5-dibromo-4-hydroxyphenyl)propane. The suitable examples of the monofunctional chain terminator may be an alcohol (e.g. methanol, or ethanol) and a hydroxy compound (e.g. phenol), in which the most preferred one is bromo or chloro substituted phenol. The compound constitutes the terminal group of the halogenated polycarbonate having a low molecular weight.

The examples of the organic or inorganic antimony compound may be antimony trioxide, antimony phosphate, triphenyl antimony, or the like, and the most preferred one is antiony trioxide. For obtaining the sufficient fire retardant effect, a mixture of the halogenated bisphenyl compound and the antimony compound in a ratio of 1:0 to 1:3 by weight may be preferably added to the thermoplastic polyester type block copolymer in a range of 5 to 40 % by weight, more preferably 10 to 30 % by weight to the block copolymer.

The thermoplastic polyester type block copolymer blended with the above fire retardant additive of the present invention has fair heat resistant in comparison with that blended with other known fire retardant additive. However, it is not still enough in case it is used for a certain utility. That is, the halogenated biphenyl compound is added to the thermoplastic polyester type block copolymer, the heat resistant properties of the block copolymer lowers in comparison with the block copolymer per se.

Then, the present inventors have studied to find a method for improving the heat resistance of the composition, and then, it has now been found that the desired composition having excellent heat resistance can be produced by adding an alkylphenol derivative having the formula (IV) or (V) and/or an epoxy compound to the above fire retardant thermoplastic polyester type block copolymer.

It has been known that an alkylphenol compound is generally useful for improving the heat resistance of polyester type block copolymer by adding it as a radical scavenger(Japanese Pat. Nos. 37,422,/1971 and 42,025/1971). Furthermore, it has been known that aromatic amine compounds and ketone-amine condensation product which are used as a radical scavenger are useful for improving the heat resistance of a thermoplastic polyester type block copolymer (U.S. Pat. No. 3,651,014, and Japanese Patent Opening Nos. 25,295/1972 and 29,896/1973). However, these aromatic amine compounds and ketone-amine condensation products are not suitable for the present composition. However, because when they are added to the present fire retardant thermoplastic polyester type block copolymer, they are not only ineffective for improving the heat resistance but also rather deteriorate the composition.

It has been surprisingly found that the alkylphenol derivative of the formula (IV) or (V) are significantly effective for improving the heat resistance of the fire retardant polyester type block copolymer.

The examples of the compound of the formula (IV) may be octyl 3,5-di-t-butyl-4-hydroxyhydrocinnamate, nonyl 3,5-di-t-butyl-4-hydroxyhydrocinnamate, lauryl 3-t-butyl-6-methyl-4-hydroxyhydrocinnamate, stearyl 3-t-butyl-6-methyl-4-hydroxyhydrocinnamate, lauryl 3,5-di-t-butyl-4-hydroxyhydrocinnamate, stearyl 3,5-di-t-butyl-4-hydroxyhydrocinnamate, ethylene glycol bis(3,5-di-t-butyl-4-hydroxyhydrocinnamate), glycerine tris(3,5-di-t-butyl-4-hydroxyhydrocinnamate), pentaerythritol tetrakis(3,5-di-t-butyl-4-hydroxyhydrocinnamate), 4-t-butylphenyl 3,5-di-t-butyl-4-hydroxycinnamate, 4-octylphenyl 3,5-di-t-butyl-4-hydroxyhydrocinnamate, 4-t-butylphenyl 3-methyl-5-t-butyl-4-hydroxyhydrocinnamate, phenyl 3-t-butyl-6-methyl-4-hydroxyhydrocinnamate, 4-t-butylphenyl 3,5-di-t-butyl-4-hydroxyhydrocinnamate, 4-nonylphenyl 3,5-di-t-butyl-4-hydroxycinnamate, N-caproyl-4-aminophenol, N-octanoyl-4-aminophenol, N-lauroyl-4-aminophenol, N-stearoyl-4-aminophenol, N-(3-phenylpropionyl)-4-aminophenol, N-[3-(3,5-di-t-butyl-4-hydroxyphenyl)propionyl]-4-aminophenol, N-[3-(4-hydroxyphenyl)acryloyl]-4-aminophenol, N-benzoyl-4-aminophenol, N-lauroyl-2,6-dimethyl-4-aminophenol, N-stearoyl-2,6-diisopropyl-4-aminophenol, N-stearoyl-2,6-di-t-butyl-4-aminophenol, N-octanoyl-2,6-diisopropyl-4-aminophenol, N-caproyl-2-t-butyl-5-methyl-4-aminophenol, N-lauroyl-2-t-butyl-5-methyl-4-aminophenol, N-stearoyl-2-t-butyl-5-methyl-4-aminophenol, N-(3-phenylpropionyl)-2,6-di-t-butyl-4-aminophenol, N-[3-(3,5-di-t-butyl-4-hydroxyphenyl)-propionyl]-2,6-di-t-butyl-4-aminophenol, N-[3-(3,5-di-t-butyl-4-hydroxyphenyl)-acryloyl]-2,6-di-t-butyl-4-aminophenol, N-benzoyl-2,6-dimethyl-4-aminophenol, N-acetyl-4-hydroxybenzylamine, N-glycoloyl-4-hydroxybenzylamine, N-lauroyl-4-hydroxybenzylamine, N-lauroyl-4-hydroxy-3-t-butyl-6-methylbenzylamine, N-stearoyl-4-hydroxy-3,5-di-t-butylbenzylamine, N-stearoyl-4-hydroxy-3-t-butyl-6-methylbenzylamine, N-(4-t-butylbenzoyl)-4-hydroxy-3-methyl-5-t-butylbenzylamine, N-lauroyl-4-hydroxy-2-methylbenzylamine, N-caproyl-4-hydroxyphenethylamine, N-stearoyl-4-hydroxy-3,5-di-t-butylphenethylamine, N-lauroyl-4-hydroxy-3-t-butyl-6-methylphenethylamine, N-stearoyl-4-hydroxy-3-methyl-5-t-butylphenethylamine, N-lauroyl-3-(4-hydroxy-3-methyl-5-t-butylphenyl)-propylamine, N-phenylacetyl-4-hydroxybenzylamine, N-stearoyl-4-hydroxycinnamylamine, N-[3-(4-hydroxy-3,5-di-t-butylphenyl)propionyl]-4-hydroxy-3,5-di-t-butylbenzylamine, N,N'-bis(4-hydroxy-3,5-di-t-butylphenethyl)adipamide, N,N'-bis(4-hydroxybenzyl)sebacinamide, N,N'-bis(4-hydroxy-3-t-butyl-6-methylbenzyl)sebacinamide, N,N',N''-tris(4-hydroxy-3-t-butyl-5-methylbenzyl)citramide, 2,2'-thiobis-(4-t-butylphenol), 2,2'-thiobis(4-methylphenol), 2,2'-thiobis(4-methyl-6-isopropylphenol), 2,2'-thiobis(4-methyl-6-t-butylphenol), 2,2'-thiobis(4-t-butyl-6-methylphenol), 2,2'-thiobis(4,6-di-t-butylphenol), 2,2'-thiobis(4-octylphenol), 2,2'-thiobis(4-nonylphenol), 2,2'-thiobis(4-decylphenol), 4,4'-thiobis(2-methylphenol), 4,4'-thiobis(4-t-butylphenol), 4,4'-thiobis(2,6-di-t-butylphenol), 4,4'-thiobis(2-methyl-6-t-butylphenol), 4,4'-thiobis(2-t-butyl-5-methylphenol), distearyl 3,5-di-t-butyl-4-hydroxybenzyl phosphonate, dilauryl 3,5-di-t-butyl-4-hydroxybenzyl phosphonate, di-n-octyl 3-t-butyl-6-methyl-4-hydroxybenzyl phosphonate, distearyl 3-t-butyl-5-methyl-4-hydroxybenzyl phosphonate, diphenyl 3,5-di-t-butyl-4-hydroxybenzyl phosphonate, bis(4-t-octylphenyl) 3,5-di-t-butyl-4-hydroxybenzyl phosphonate, distearyl 3,5-di-t-butyl-4-hydroxyphenethyl phosphonate, distearyl 3,5-di-t-butyl-2-hydroxybenzyl phosphonate, distearyl 3,5-di-t-butyl-4-hydroxyphenyl phosphonate, diphenyl 3,5-di-t-butyl-4-hydroxyphenyl phosphonate, dilauryl 3,5-di-t-butyl-4-hydroxyphenylphosphate, stearyl bis(3,5di-t-butyl-4-hydroxyphenyl) phosphate, phenyl bis(3,5-di-t-butyl-4-hydroxyphenyl)phosphate, lauryl bis(3,5-di-t-butyl-4-hydroxyphenyl) phosphate, tris(3,5-di-t-butyl-4-hydroxyphenyl) phosphate, or the like. Among these compounds, the preferred one is the compound of the formula (IV) wherein $r_1$ is an integer of 2 to 4. Most preferred is the compound of the formula (IV) wherein the bonding valence of R is 4 and $r_1$ is 4.

The examples of the compound of the formula (V) may be substituted monophenols (e.g. 2,6-di-t-butyl-4-methylphenol, 2,6-di-t-butyl-4-octylphenol, 2-methyl-6-t-butyl-4-methylphenol, 2-methyl-6-t-butyl-octylphenol, or 2-methyl-6-t-butyl-4-nonylphenol); alkylidenebis(alkylphenols) (e.g. 2,2'-methylenebis(4-methyl-6-isopropylphenol), 2,2'-methylenebis(4-methyl-6-t-butyl-phenol), 2,2'-methylenebis(4-ethyl-6-t-butylphenol), 2,2'-methylenebis(4-t-butyl-6-methylphenol), 2,2'-methylenebis(4,6-di-t-butylphenol), 4,4'-methylenebis(2,6-di-t-butylphenol), 4,4'-methylenebis(2-methyl-6-t-butylphenol), 4,4'-methylenebis(2-t-butyl-5-methylphenol), 2,2'-ethylidenebis(4-methyl-6-t-butylphenol), 2,2'-ethylidenebis(4,6-di-t-butylphenol), 2,2'-isopropylidenebis(4-methyl-6-isopropylphenol), 2,2'-isopropylidenebis(4-isopropyl-6-methylphenol), 2,2'-isopropylidenebis(4-methyl-6-t-butylphenol), 4,4'-isopropylidenebis(2,6-di-t-butylphenol), 4,4'-isopropylidenebis(2-methyl-6-t-butylphenol), 4,4'-isopropylidenebis(2-t-butyl-5-methylphenol), 4,4'-butylidenebis(2-t-butyl-5-methylphenol), 4,4'-butylidenebis(2-methyl-6-t-butylphenol), 4,4'-butylidenebis(2,6-di-t-butylphenol), 4,4'-cyclohexylidenebis(2-methyl-6-t-butylphenol), 4,4'-cyclohexylidenebis(2-t-butyl-5-methylphenol), or 4,4'-cyclohexylidenebis(2,6-di-t-butylphenol); polyphenols (e.g. 1,1,3-tris(2-methyl-4-hydroxy-5-t-butylphenyl)-butane, or 2,4,6-tris(3,5-di-t-butyl-4-hydroxybenzyl)-mesitylene) or the like. Among these compounds, the preferred one is the compounds of the formula (V) wherein $r_2$ is an integer of 2 to 4.

The alkylphenol derivative may be added to the composition in an amount of 0.1 to 10 % by weight on the basis of the whole composition.

The epoxy compound used in the invention is the one having at least one oxirane oxygen and the content of the oxirane oxygen is in a range of 1 to 20 % by weight. The epoxidation equivalent weight is usually 80 to 1,600. The epoxy compound has a molecular weight of about 100 to 10,000.

The examples of the epoxy compound may be reaction products of a phenol (e.g. phenol, cresol, pyrogallol, chlorophenol, 2,2-bis(4-hydroxyphenyl)propane, 2,2-bis(3,5-dibromo-4-hydroxyphenyl)propane, or hydroquinone) with epichlorohydrin; reaction products of an alcohol (e.g. aliphatic alcohol, alicyclic alcohol, polymethylene glycol, or polyalkylene glycol) with epichlorohydrin; glycidyl esters of aromatic, aliphatic or alicyclic carboxylic acid; epoxidation products of unsaturated compound (e.g. aliphatic or alicyclic epoxy compound); epoxidation products of vegetable oil comprising unsaturated aliphatic acid esters (e.g. epoxidized soyabean oil, epoxidized linseed oil, epoxidized castor oil, or epoxidized tall oil).

The epoxy compound may be added to the composition in an amount of 0.1 to 10 % by weight.

The alkylphenol derivative and the epoxy compound are added to the fire retardant thermoplastic polyester type block copolymer composition for improving the heat resistance thereof and may be added together or each alone. When they are added together, the preferable total amount may be in a range of 0.5 to 15 % by weight.

In the present composition, there may be further added a peroxide decomposer.

The examples of the peroxide decomposer may be sulfide compounds or phosphite compounds which are described in Japanese Patent No. 37423/1971, thiocarbamate compounds such as nickel dithiocarbamate which are described in Belgian Pat. No. 786,763.

In the present composition, there may be still further added a thermoplastic resin (e.g. polyethylene, or polyester), an organic or inorganic pigment (e.g. carbon black, or titanium oxide), a modifier (e.g. ultraviolet absorber or antistatic agent), an organic or inorganic filler or reinforcement (e.g. alumina, silicon oxide, calcium carbonate, talc, glass fiber, or carbon fiber), or the like.

The fire retardant thermoplastic polyester type block copolymer composition of the present invention is in extremely good dispersed state, and therefore it has excellent mechanical strength and further heat resistance, while the composition blended with other conventional fire retardant additive has inferior heat resistance and low mechanical strength because of the inferior dispersibility of the fire retardant additive.

Furthermore, the heat resistance of the composition is improved by adding to the alkylphenol derivative and/or the epoxy compound.

The present fire retardant composition has excellent heat resistance, cold proofing, toughness which are peculiar characteristics of the thermoplastic polyester type block copolymer, and further has excellent self-extinguishing properties, and therefore can be used in the fields which require the excellent heat resistance and fire retardant, such as for wire coating material, electrical parts, automobile parts, building components, or the like.

The present invention may be illustrated by the following Examples, but not limited thereto. In the Examples, "part" means part by weight, and the method for the tests are as follows:

1. Flammability test

It was measured in accordance with the provision of ASTM D-635. That is, the composition was injection-molded to give a test piece having 13 mm in width, 127 mm in length and 3.0 mm in thickness. A mark line was drawn at 25 mm from the end. The test piece was clamped on one end in a support with its longitudinal axis horizontal and its transverse axis inclined at 45° to the horizontal, which was contacted with a blue flame of 25 mm in length from Bunsen burner inclined at 45° for 30 seconds, and thereby the burning rate (cm/minute) was measured. The self-extinguishing properties were shown by the time (second) from the taking off the burner till its extinguishing.

2. Heat resistance test

The composition was injected-molded into dumbbell Die C to give a test piece as in above (1). The test piece was hung in Geer oven, and thereby the aging test was carried out at a fixed temperature for a fixed time as mentioned in each Example. The weight reduction of the test piece, retention of strength and elongation were measured. The tensile test was carried out in accordance with the provision of ASTM D-412 by using Tensilon UTM-II type (made by Toyo Sokuki).

3. Reduced viscosity ($\eta sp/c$)

It was measured in concentration of 0.2 g/100 cc in phenol/tetrachloroethane: 6/4 by weight and at 30°C.

4. Melting point

By using a micromelting point apparatus (made by Yanagimoto Seisakusho), the temperature was rised in a rate of 3°C/minute and the point was checked when the polarized light disappeared.

Example 1

Thermoplastic polyester type block copolymer A (melting point: 180°C, reduced viscosity $\eta sp/c$: 3.10) was produced from dimethyl terephthalate (3.24 parts), polytetramethylene oxide glycol having average molecular weight of about 2,000 (10.0 parts), 1,4-butanediol (10.0 parts), tetrabutyl titanate (catalyst; 0.05 % by weight on the basis of the polymer) and 1,3,5-trimethyl-2,4,6-tri(3,5-di-t-butyl-4-hydroxybenzyl)benzene (antioxidant; 0.2 % by weight on the basis of the polymer). The thermoplastic polyester type block copolymer A (7.0 parts), 2,2-bis[4-(2,3-dibromopropoxy)-3,5-dibromophenyl]propane (2.2 parts) and antimony trioxide (0.8 part) were mixed and melt-kneaded and pelletized by an extruder to give pellets. The pellets were injection-molded to give various test pieces, on which flammability, heat resistance test and tensile test were carried out. The results are shown in Table 1.

COMPARATIVE EXAMPLE 1

A test piece was produced in the same manner as described in Example 1 except that no fire retardant additive was used.

COMPARATIVE EXAMPLE 2

A test piece was produced in the same manner as described in Example 1 except that 2,2-bis(3,5-dibromo-4-hydroxyphenyl)propane was used instead of 2,2-bis[4-(2,3-dibromopropoxy)-3,5-dibromophenyl]propane.

COMPARATIVE EXAMPLE 3

A test piece was produced in the same manner as described in Example 1 except that tetrachlorophthalic anhydride was used instead of 2,2-bis[4-(2,3-dibromopropoxy)-3,5-dibromophenyl]propane.

The test pieces obtained in Comparative Examples 1 to 3 were tested in the same manner as in Example 1. The results are shown in Table 1.

Table 1

| Ex. | Fire retardant additive | Addition amount based on the whole composition % | Strength kg/cm² | Elongation rate % | Flammability | Heat resistance (120°C × 5 days) Retention of strength % | Weight reduction % |
|---|---|---|---|---|---|---|---|
| Ex. 1 | 2,2-Bis[4-(2,3-dibromophenoxy)-3,5-dibromophenyl]propane | 22 | 134 | 680 | Self-extinguishing 0.2 second | 50 | 1.1 |
| | Sb₂O₃ | 8 | | | | | |
| Comp. Ex. 1 | None | — | 190 | 650 | Flame 5.0 cm/min. | 90 | 0.5 |
| Comp. Ex. 2 | 2,2-Bis(3,5-dibromo-4-hydroxyphenyl)propane | 20 | 146 | 670 | Self-extinguishing 0.6 second | 0 | 4.1 |
| | Sb₂O₃ | 10 | | | | | |
| | Tetrachlorophthalic anhydride | 15 | 132 | 713 | Self-extinguishing 1.2 second | 85 | 15.3 |
| | Sb₂O₃ | 6 | | | | | |

As made clear from the test results, the composition of Example 1 had excellent fire retardant and heat resistance. On the other hand, the product of Comparative Example 1 was flammable, the product of Comparative Example 2 showed sufficient fire retardance and initial strength but inferior heat resistance and the strength after heat aging being zero, and the product of Comparative Example 3 showed at first excellent fire retardance but the fire retardant additive was volatilized and thereby the fire retardant effect was reduced when it was treated at a high temperature.

EXAMPLE 2

When the same resin and fire retardant additive as in Example 1 were mixed and melt-kneaded by an extruder, various alkylphenol derivatives, epoxy compounds or amine compounds were added to give various pellets of fire retardant thermoplastic polyester type block copolymer composition. The pellets were injection-molded to give test pieces, on which flammability test and heat resistance test were carried out. Likewise, the products having no fire retardant additive were also tested. The test results are shown in Table 2.

oxidized soyabean oil Epoxy B: 2,2-bis(4-hydroxyphenyl)propane diglycidyl ether Aromatic amine A: bis-β-naphthyl-paraphenylenediamine Ketone-amine condensate: polymerized 2,2,4-trimethyl-1,2-hydroquinoline Sulfide A: dilauryl thiodipropionate As made clear from the test results, i. when a radical scavenger such as an alkylphenol, aromatic amine or ketone-amine condensate was added to the polyester type block copolymer, the heat resistance of the polymer was improved but the composition had no self-extinguishing properties and flamed (compare the Test Example No. 1 and the Test Example Nos. 2, 3, 4, 6 and 7), ii. the heat resistance was not improved even by adding an epoxy compound to the polyester type block copolymer (compare the Text Example No. 1 and Test Example No. 5), iii. when a fire retardant additive was added to the polyester type block copolymer, the self-extinguishing properties were given, but the heat resistance was low- Table 2

| Test Ex. No. | Fire retardant additive % | Radical scavenger % | Epoxy compound % | Others | Strength kg/cm² | Elongation rate % | Flammability | Heat resistance (120°C × 10 days) Retention of strength % | Retention of elongation % |
|---|---|---|---|---|---|---|---|---|---|
| No. 1 | — | — | — | — | 190 | 650 | Flame 5.0 cm/min. | 68 | 79 |
| No. 2 | — | Alkylphenol A 0.6 | — | — | 196 | 680 | '' | 100 | 100 |
| No. 3 | — | Aromatic amine A 0.6 | — | — | 193 | 704 | '' | 100 | 100 |
| No. 4 | — | Ketone-amine condensate 0.6 | — | — | 198 | 670 | '' | 100 | 100 |
| No. 5 | — | — | Epoxy A 0.6 | — | 191 | 710 | '' | 66 | 75 |
| No. 6 | — | Alkylphenol A 0.6 | Epoxy B 0.6 | — | 190 | 690 | '' | 100 | 100 |
| No. 7 | — | Alkylphenol B 3 | — | — | 194 | 630 | '' | 100 | 100 |
| No. 8 | A 30 | — | — | — | 134 | 770 | Self-extinguishing 0.2 second | 18 | 28 |
| No. 9 | '' | Alkylphenol A 0.6 | — | — | 141 | 820 | '' | 74 | 82 |
| No. 10 | '' | Aromatic amine A 0.6 | — | — | 136 | 870 | '' | 24 | 41 |
| No. 11 | '' | Ketone-amine condensate 0.6 | — | — | 138 | 810 | '' | 22 | 39 |
| No. 12 | '' | Alkylphenol B 3 | — | — | 132 | 780 | '' | 85 | 93 |
| No. 13 | '' | Alkylphenol A 0.6 | — | Sulfide 0.3 | 137 | 760 | '' | 85 | 90 |
| No. 14 | '' | — | Epoxy A 0.6 | — | 140 | 800 | '' | 66 | 75 |
| No. 15 | '' | Alkylphenol A 0.6 | Epoxy B 0.6 | — | 143 | 790 | '' | 100 | 100 |
| No. 16 | '' | Aromatic amine A 0.6 | Epoxy B 0.6 | — | 139 | 770 | '' | 61 | 72 |

[Note]: Fire retardant A: a mixture of 2,2-bis[4-(2,3-di-bromopropoxy)-3,5-dibromophenyl]propane and antimony trioxide in a ratio of 22:8 by weight Alkylphenol A: pentaerythritol tetrakis(3,5-di-t-butyl-4-hydroxycinnamate) Alkylphenol B: 2,2'-methylenebis(4-methyl-6-t-butylphenol) Epoxy A: epered (compare the Test Example No. 1 and the Test Example No. 8), iv. when an alkylphenol (radical scavenger) was added to the fire retardant composition as mentioned in above item (iii), the heat resistance was fairly improved (compare the Test Example No. 8 and the Test Example Nos. 9, 12, 13, and 15), v. the heat resistance was not improved even when an aromatic amine or ketone-amine condensate (as radical scavenger) was added to the free retardant composition as mentioned in above item (iii), which means that a specific radical scavenger is useful for improving the heat resistance of thermoplastic polyester type block copolymer composition (compare the Test Example Nos. 10 and 11 and the Test Example Nos. 9, 12 and 13), iv. when an epoxy compound was added to the fire retardant composition as mentioned in above item (iii), the heat resistance was also improved (see the Test Example Nos. 14 and 15), vii. when both of epoxy compound and alkylphenol derivative were added to the fire retardant composition as mentioned in item (iii), the heat resistance was particularly improved (see the Test Example No. 15), and viii. even when any alkylphenol derivative or any epoxy compound was added to the fire retardant composition, the fire retardant properties were not deteriorated (see Test Example Nos. 9, 12, 13, 14 and 15).

EXAMPLE 7

Thermoplastic polyester type block copolymer B (melting point: 215°C, reduced viscosity $\eta sp/c$: 1.65) was produced from dimethyl terephthalate (10 parts), polytetramethylene oxide glycol having average molecular weight of about 1,000 (3.8 parts), 1,4-butanediol (5.8 parts), tetrabutyl titanate (catalyst; 0.05 % by weight on the basis of the polymer) and 1,3,5-trimethyl-2,4,6-tri(3,5-di-t-butyl-4-hydroxybenzyl)benzene (antioxidant; 0.2 % by weight on the basis of the polymer). The thermoplastic polyester type block copolymer B (8 parts) and hexabromodiphenyl ether (as a fire retardant additive) were mixed and melt-kneaded by an extruder, and further treated in the same manner as described in Example 1 to give test pieces, on which various tests were carried out likewise. The results are shown in Table 4.

EXAMPLES 8 TO 10

The Example 7 was repeated except that hexabromodiphenyl ether was used 1.6 parts instead of 2.0 parts and antimony trioxide (0.4 part) was used, and further various stabilizers as mentioned in Table 3 were added. The test pieces thus obtained likewise. The results are shown in Table 4.

COMPARATIVE EXAMPLE 6

The Example 7 was repeated except that no fire retardant additive was used and stabilizers as mentioned in Table 3 were added. The test piece thus obtained was tested likewise. The results are shown in Table 4.

Table 3

| No. | Fire retardant additive (weight %) | Stabilizer (weight %) | | |
|---|---|---|---|---|
| | | Alkylphenol | Epoxy | Sulfide |
| Ex. 7 | Hexabromodiphenyl ether (20) | — | — | — |
| Ex. 8 | Hexabromodiphenyl ether (16) Sb₂O₃ (4) | Alkylphenol A (0.3) | — | Sulfide A (0.3) |
| Ex. 9 | " | Alkylphenol A (1.5) | — | " |
| Ex. 10 | " | Alkylphenol A (0.3) | Epoxy C (1.2) | " |
| Comp. Ex. 6 | None | Alkylphenol A (0.3) | — | " |

[Note]: Alkylphenol A: pentaerythritol tetrakis(3,5-di-t-butyl-4-hydroxycinnamate) Sulfide A: dilauryl thiodipropionate Epoxy compound C: a compound having epoxidation equivalent weight of 270 to 230, melting point of 60 to 80°C and the following formula:

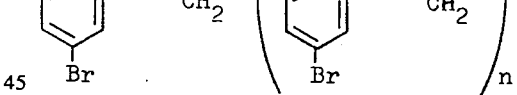

Table 4

| No. | Flammability | Strength kg/cm² | Elongation rate % | Heat resistance (140°C × 7 days) | |
|---|---|---|---|---|---|
| | | | | Retention of strength % | Weight reduction % |
| Ex. 7 | Self-extinguishing 0.6 second | 261 | 512 | 51 | 1.3 |
| Ex. 8 | Self-extinguishing 0.3 second | 265 | 500 | 89 | 1.1 |

Table 4-continued

| No. | Flammability | Strength kg/cm² | Elongation rate % | Heat resistance (140°C × 7 days) Retention of strength % | Heat resistance (140°C × 7 days) Weight reduction % |
|---|---|---|---|---|---|
| Ex. 9 | Self-extinguishing 0.3 second | 265 | 500 | 95 | 1.1 |
| Ex. 10 | Self-extinguishing 0.3 second | 265 | 500 | 93 | 1.1 |
| Comp. Ex. 6 | Flame 3.5 cm/min. | 365 | 380 | 56 | 0.6 |

As made clear from the above test results, hexabromobiphenyl ether showed excellent fire retardant effect but not sufficient heat resistance effect. The heat resistance was significantly improved by adding an alkylphenol derivative and an epoxy compound.

EXAMPLE 11

To polyester type block copolymer B as used in Example 7 was added 25 % by weight of polycarbonate having low molecular weight (melting point: 190°C) and having repeated units of the formula:

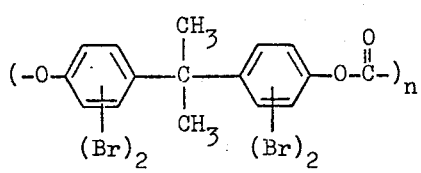

wherein n is about 4 and being chain stopped by 2,4,6-tribromophenoxy group, and the mixture was treated in the same manner as described in Example 1 to give a test piece, on which various tests were carried out likewise. The results were as follows:

Flammability: self-extinguishing 1.2 second
Strength: 275 kg/cm²
Elongation: 430 %
Heat resistance (150°C, 10 days):
  Retention of strength: 58 %
  Weight reduction: 0.8 %

As made clear from the above test results, the fire retardant additive as mentioned above can also give a product having excellent strength and fairly excellent heat resistance. In this fire retardant composition, the heat resistance is improved by adding an alkylphenol derivative and/or epoxy compound.

EXAMPLE 12

Polyethylene terephthalate (molecular weight: 20,400; 10 parts), ε-caprolactone (10 parts) and dibutyl tinlaurate (0.02 part) were reacted at 240°C for 2 hours in nitrogen gas to give polyester type block copolymer (melting point: 200°C, reduced viscosity: 1.60). The copolymer (7.5 parts), 2,2-bis[4-(2,3-dibromopropoxy)-3,5-dibromophenyl]propane (1.9 parts) and antimony trioxide (0.6 part) were mixed and melt-kneaded and then pelletized by an extruder to give pellets. The pellets thus obtained were injection-molded to give test pieces, on which flammability test and tensile test were carried out. The results are shown in Table 5. As made clear from the results, the composition of the Example showed excellent fire retardant.

Table 5

| | Fire retardant additive | Strength kg/cm² | Elongation % | Flammability |
|---|---|---|---|---|
| Example | 2,2-bis[4-(2,3-dibromopropoxy)-3,5-dibromophenyl]propane and antimony trioxide | 130 | 700 | Self-extinguishing 0.3 second |
| Comparative example | None | 180 | 670 | Flame 4.0 cm/min. |

EXAMPLE 13

Pellets (1000 parts) of polyester type block copolymer (melting point: 175°C, reduced viscosity ηsp/c: 1.70) produced from dimethyl terephthalate (500 parts), dimethyl isophthalate (270 parts), 1,4-butanediol (440 parts) and polytetramethylene oxide glycol having molecular weight of 1,000 (290 parts) were kneaded together with 2,2-bis[4-(2,3-dibromopropoxy)-3,5-dibromophenyl]propane (100 parts) and antimony trioxide (100 parts) and pelletized by a biaxial extruder. The pellets thus obtained were dried by hot air at 100°C for 2 hours and then injection-molded to give a test piece for flammability test. The limiting oxygen index of the piece was 31.2, which means the product has excellent fire retardant (i.e. self-extinguishing characteristics) in air.

What is claimed is:

1. A fire retardant thermoplastic polyester block copolymer composition, which comprises (a) a thermoplastic polyester block copolymer consisting of a hard polyester segment having a high melting point and a soft polymer segment having a low melting point and a molecular weight of 400 to 6,000, wherein the hard polyester segment has a melting point of 150°C or more when a high molecular weight polymer is produced from the component thereof alone, and the soft polymer segment has a melting point or softening point of 80°C or less and is included in a ratio of 1 to 85% by weight, and (b) a mixture of one or more kinds of halogenated bisphenyl compounds selected from the group consisting of a compound of the formula (I), and a compound of the formula (II) and an organic or inorganic antimony compound in a ratio of 1:0 to 1:3 by weight:

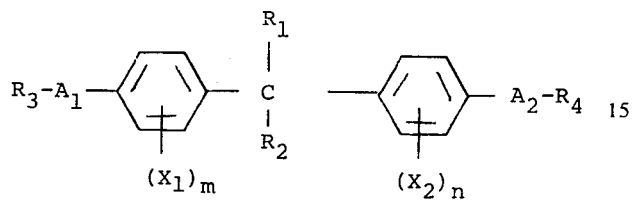

(I)

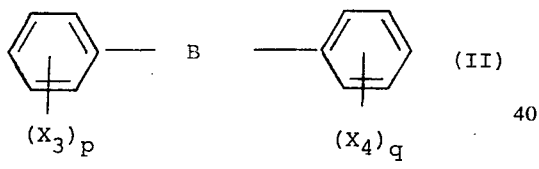

(II)

wherein $R_1$ and $R_2$ are each hydrogen or an alkyl having 1 to 4 carbon atoms: $R_3$ and $R_4$ are each an alkyl having 1 to 18 carbon atoms; an acyl or glycidyl wherein the hydrogen combined with carbon atoms may be substituted by bromine or chlorine; $A_1$, $A_2$, are each oxygen or sulfur; B is oxygen, sulfur or sulfoxide; $X_1$, $X_2$, $X_3$, $X_4$, are each bromine or chlorine; m and n are an integer of 1 to 4 and $m + n$ is 4 to 8; and p and q are an integer of 1 to 5 and $p + q$ is 4 to 10.

2. The fire retardant thermoplastic polyester block copolymer composition according to claim 1, wherein the soft polymer segment having a low melting point is included in a ratio of 5 to 80% by weight in the thermoplastic polyester block copolymer.

3. The fire retardant thermoplastic polyester block copolymer composition according to claim 1, wherein the thermoplastic polyester block copolymer comprises a hard polyester segment having a high melting point produced from a dicarboxylic acid containing 70 or more % by mol of terephthalic acid or its ester-forming derivative and an aliphatic, aromatic or alicyclic diol and a soft polymer segment having a low melting point produced from a polyalkylene oxide glycol.

4. The fire retardant thermoplastic polyester block copolymer composition according to claim 3, wherein the hard polyester segment having a high melting point is produced from a dicarboxylic acid containing 70 or more % by mol of telephthalic acid or its ester-forming derivative and an aliphatic diol.

5. The fire retardant thermoplastic polyester block copolymer composition according to claim 1, wherein the thermoplastic polyester block copolymer comprises a hard polyester segment having a high melting point produced from a dicarboxylic acid containing 70 or more % by mol of terephthalic acid or its ester-forming derivative and a diol containing 70 or more % by mol of 1,4-butanediol and a soft polymer segment having a low melting point produced from a polytetramethylene oxide glycol.

6. The fire retardant thermoplastic polyester block copolymer composition according to claim 1, wherein all of $X_1$, $X_2$, $X_3$, $X_4$, in the formulae (I), and (II) are bromine.

7. The fire retardant thermoplastic polyester block copolymer composition according to claim 1, wherein $p + q$ in the formula (II) is an integer of 6 to 10.

8. The fire retardant thermoplastic polyester block copolymer composition according to claim 1, wherein the organic or inorganic antimony compound is antimony trioxide.

9. The fire retardant thermoplastic polyester block copolymer composition according to claim 1, wherein one or more kinds of alkylphenol derivatives of the formula (IV) or (V) are further added:

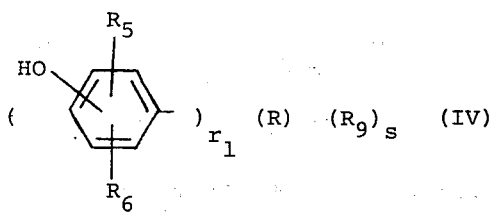

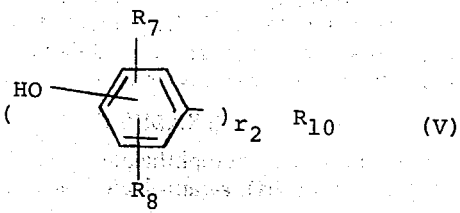

wherein $R_5$, $R_6$, $R_7$ and $R_8$ are each an alkyl having 1 to 18 carbon atoms, $R_9$ and $R_{10}$ are each a hydrocarbon group having 1 to 18 carbon atoms, R is a hydrocarbon group having one or more groups selected from —COO—, —NHCO— and

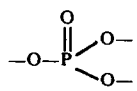

in the molecular chain or on the terminal of the molecule, —S—, —NHCO— or

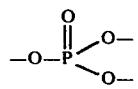

$r_1$ and $r_2$ are each integer of 1 to 4, and $s$ is a numeral such that $(r_1+s)$ is equal to the numeral of the total bonding valence of R.

10. The fire retardant thermoplastic polyester block copolymer composition according to claim 1, wherein an epoxy compound having 1 to 20% by weight of oxirane oxygen is further added.

11. The fire retardant thermoplastic polyester block copolymer composition according to claim 9, additionally containing an epoxy compound having 1 to 20% by weight of oxirane oxygen.

12. The fire retardant thermoplastic polyester block copolymer composition according to claim 9, wherein the $r_1$ in the alkylphenol derivatives of the formula (IV) is an integer of 2 to 4.

13. The fire retardant thermoplastic polyester block copolymer composition according to claim 9, wherein the $r_2$ in the alkylphenol derivative of the formula (V) is an integer of 2 to 4.

14. The fire retardant thermoplastic polyester block copolymer composition according to claim 9, wherein the alkylphenol derivative has the formula (IV) wherein the numeral of the total bonding valent of R is 4 and $r_1$ is 4.

15. The fire retardant thermoplastic polyester block copolymer composition according to claim 1, wherein the halogenated bisphenyl compound is contained in a range of about 5 to 40% by weight and the organic or inorganic antimony compound is contained in a range of about 0 to 30% by weight on the basis of the whole composition.

16. The fire retardant thermoplastic polyester block copolymer composition according to claim 15, wherein an alkyl phenol derivative is further added in a range of about 0.5 to 10% by weight on the basis of the whole composition.

17. The fire retardant thermoplastic polyester block copolymer composition according to claim 15, wherein an epoxy compound is further added in a range of about 0.5 to 10 % by weight on the basis of the whole composition.

18. The fire retardant thermoplastic polyester block copolymer composition according to claim 15, wherein an alkyl phenol derivative and an epoxy compound are added totally in a range of about 0.5 to 15% by weight on the basis of the whole composition.

* * * * *